(12) United States Patent
Bibeau

(10) Patent No.: US 7,350,873 B2
(45) Date of Patent: Apr. 1, 2008

(54) BACKBOARD BAR WITH ADJUSTING CLOSURE

(76) Inventor: Marcel Bibeau, 4581, Castle D'Autray, St. Felix-de-Valois (CA) J0K 2M0

( * ) Notice: Subject to any disclaimer, the term of this patent is extended or adjusted under 35 U.S.C. 154(b) by 78 days.

(21) Appl. No.: 10/595,311
(22) PCT Filed: Oct. 6, 2004
(86) PCT No.: PCT/CA2004/001801

§ 371 (c)(1),
(2), (4) Date: Apr. 6, 2006

(87) PCT Pub. No.: WO2005/088165

PCT Pub. Date: Sep. 22, 2005

(65) Prior Publication Data

US 2007/0085365 A1 Apr. 19, 2007

(30) Foreign Application Priority Data

Oct. 6, 2003 (CA) .................................... 2443020

(51) Int. Cl.
*B60P 1/00* (2006.01)
(52) U.S. Cl. ................ 298/23 M; 298/23 R
(58) Field of Classification Search .......... 298/23 MD, 298/23 M, 23 R, 23 S; 296/50, 56, 146.8; 49/339–340, 344–345
See application file for complete search history.

(56) References Cited

U.S. PATENT DOCUMENTS 5,816,766 A 10/1998 Clark
6,698,842 B1 * 3/2004 Cornell et al. ........... 298/23 M

OTHER PUBLICATIONS

International Search Report dated Feb. 24, 2005 (1 page).

* cited by examiner

*Primary Examiner*—Stephen Gordon
(74) *Attorney, Agent, or Firm*—Darby & Darby P.C.

(57) ABSTRACT

Disclosed is a latching assembly for use to lock the tailgate of a dump body of a truck. This assembly has a latch catch which is fixed to the tailgate and is devised in such a manner as to allow adjustment of the distance between its contact surface and the tailgate. The assembly has a pivotable hook with a projection positioned and shaped to abut against the contact surface of the latch catch. An actuator is provided to transmit pivotal movement to the hook via a set of links so as to turn this hook between a first position wherein the hook projection abuts against the contact surface of the latch catch, thereby preventing opening of the tailgate, and a second position wherein the hook projection is released from the latch catch, thereby enabling the tailgate to open.

17 Claims, 2 Drawing Sheets

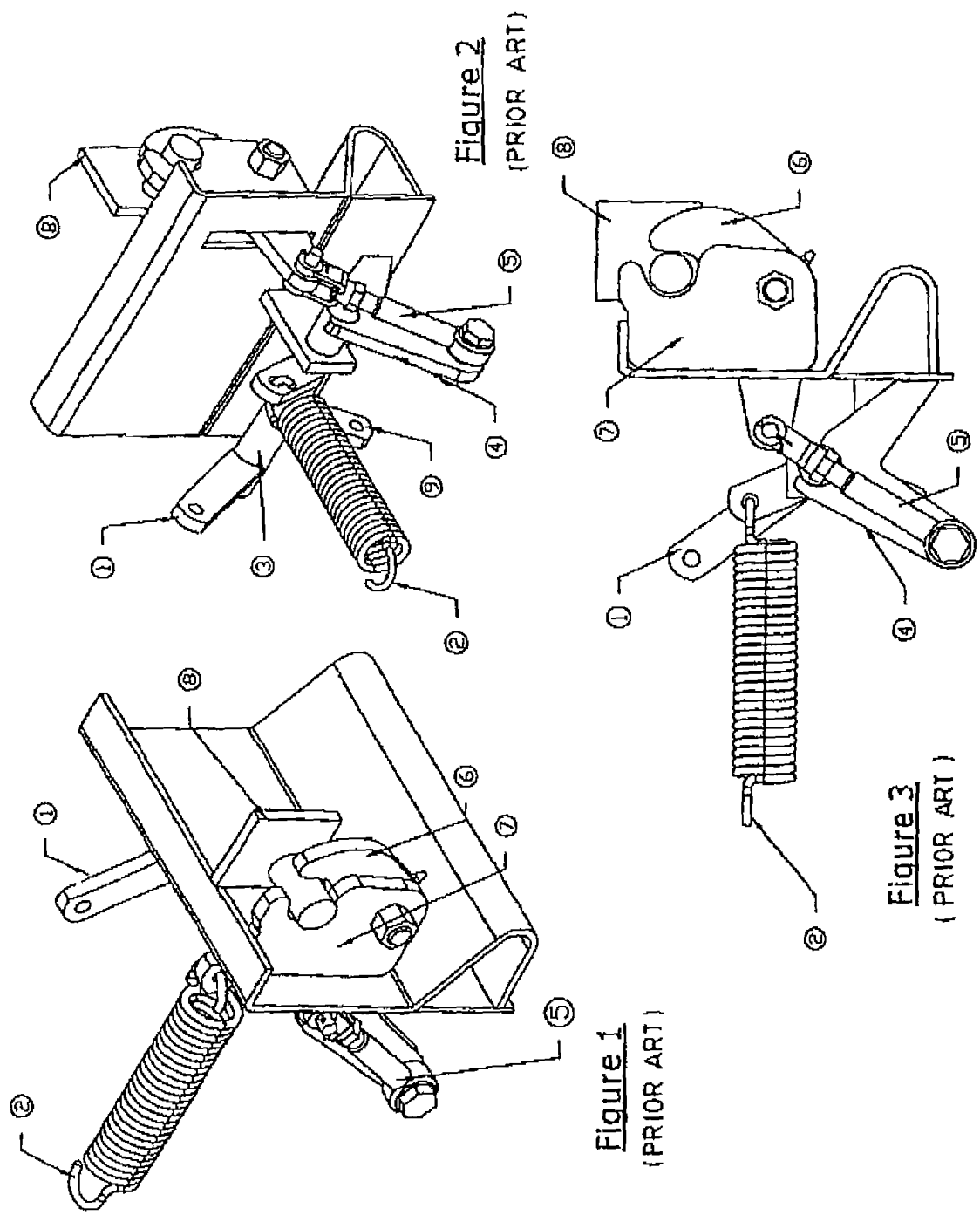

BACKBOARD BAR WITH ADJUSTING CLOSURE

FIELD OF THE INVENTION

The present invention relates to a backboard bar hereinafter called "latching assembly".

More precisely, the invention relates to a latching assembly especially adapted for use to lock the tailgate of a dump body of a truck.

BACKGROUND OF THE INVENTION

Until now, latching of the tailgate of a dump body of a truck has been achieved by actuating a system of pivoting members or links via an operating lever located near the front of the dump body and/or activated by a command operated by the conductor of the vehicle. An example of such a system is illustrated in FIGS. 1 to 3 of the drawings, identified as "Prior Art".

It is known that the links of such a system of pivoting members are subject to wear and break, making sometimes the latching inoperative. It is also known that the stem connecting the links to the latching assembly of the tailgate can be prone to stretching or folding, because the direct force applied to the tailgate can be rather high, such once again making the latching inoperative or unsafe. Moreover, it is often difficult to repair, adjust and do the maintenance of the existing systems because they are less accessible and are caught in rust and dirtyness under the dump body.

OBJECTS OF THE INVENTION

An object of the present invention is to provide a latching assembly especially adapted for use to lock the tailgate of a dump body of a truck, the assembly having a structure allowing easy adjustment of the closure of the tailgate as well as adjustment of the leaning of the tailgate on the rear part of the dump body.

Another object of the present invention is to provide a latching assembly where wear out spots are minimized in use.

Still another object of the present invention is to provide a latching assembly which can be installed on any conventional dump body.

SUMMARY OF THE INVENTION

In accordance with the invention, the objects mentioned hereinabove are achieved with a latching assembly for a dump body, which includes a hook actuated by means for transmitting movement from an actuator, said means preferably comprising links which are provided with support points and are connected to the actuator. A new type of latch catch for the hook is employed to replace the conventional tailgate locking stems. This latch catch is easily accessible and can be set to achieve an adjustment of the closure of the latching assembly and thus of the degree of closing and leaning of the tailgate on the back part of the dump body. The hook, the mechanical levers and the other parts which actuate them, form a safe and distinct unit that is connected to a back post of the frame of the dump body.

More precisely, the invention as claimed is directed to a latching assembly for use to close a tailgate of a dump body having a frame, this latching assembly comprising:

a latch catch having a contact surface, the latch catch being fixed to the tailgate with its contact surface extending at a given distance away from the tailgate;

a hook pivotably mounted on a first pivot fixed to the frame of the dump body, the hook having a projection positioned and shaped to abut against the contact surface of the latch catch;

an actuator fixed to the frame of the dump body; and means for transmitting movement from the actuator to the hook.

In use, the actuator transmits a rotational movement to the hook which is then turned between a first position in which the hook projection abuts against the contact surface of the latch catch, thereby preventing opening of the tailgate, and a second position wherein the hook projection is freed from any displacement trajectory from the latch catch, thereby enabling the tailgate to open.

In accordance with the invention, the latch catch also comprises adjustment means for adjusting the distance between the contact surface and the tailgate.

It will be understood here that the actuator and mechanical links used as means for transmitting movement from the actuator to the hook of the latching assembly cooperate for the purposes of:

holding the latching assembly normally locked;

adjusting the minimal pressure required for opening as a function of the actuation required (for example 20 lbs/in$^2$); and unconnecting the actuator while maintaining the latching assembly closed.

It will be also understood that the hook of the latching assembly disengages the latch catch while being actuated upwards. Thus nothing can get wedged between the hook and the latch catch and can prevent the system from being suitably locked.

The latching assembly according to the invention is different from the existing locking systems in that the latch catch of the hook comprises easily accessible adjustment means. This feature makes it possible to adjust the leaning of the tailgate on the rear part of the dump body and also to adjust the closure of the latching assembly. During operation of the dump body, the efforts applied to the tailgate can thus be reduced in order to preserve the resistance of the tailgate and to make it sure that the load of the dump body does not flow dangerously out of the same.

The latching assembly according to the invention thus leads to a reduction of jointed elements and decreases the risks of wear and break.

It is worth noting that the latching assembly according to the invention is compatible with conventional dumping bodies and permits to improve of their functions.

BRIEF DESCRIPTION OF THE DRAWINGS

FIGS. 1 to 3 identified as "Prior Art", are an isometric front view, an isometric back view and a side elevation view of a conventional tailgate latching assembly;

DETAILED DESCRIPTION OF A PREFERRED EMBODIMENT OF THE INVENTION

Figure 5:
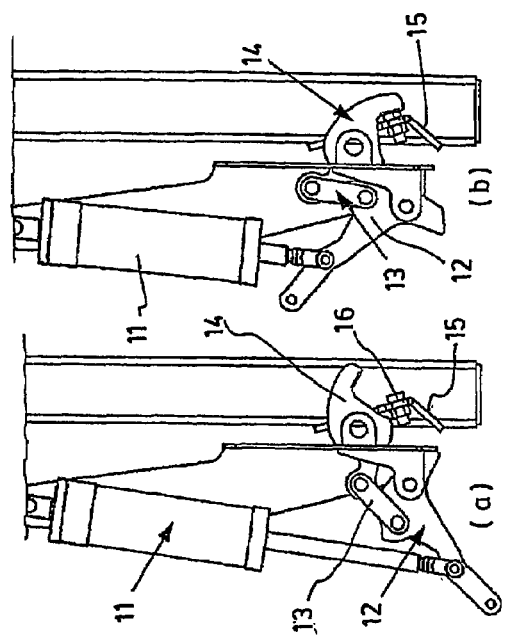
FIGS. 5a and b are side elevational views showing the latching assembly of FIG. 4 in open and closed positions.
Figure 7:
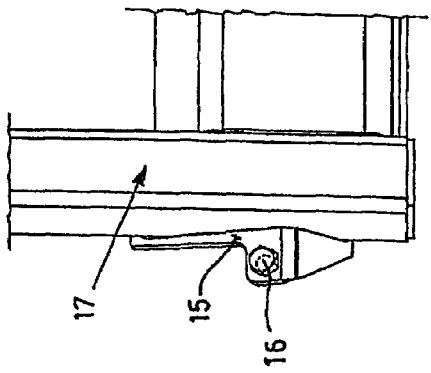
FIG. 7 is a front elevational view showing the latch catch on a back post of the dump body.
Figure 4:
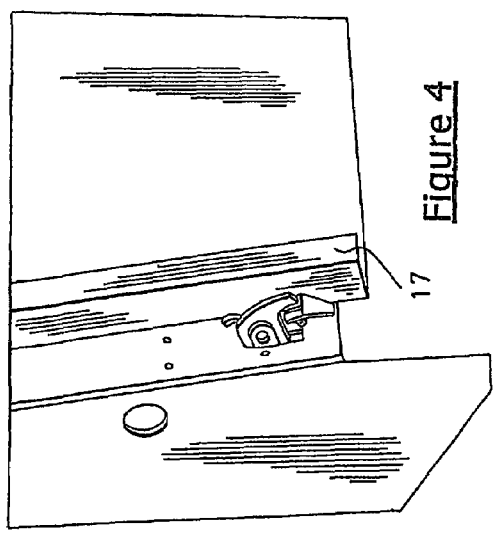
FIG. 4 is an isometric view of a latching assembly according to a preferred embodiment of the present invention.
Figure 6:
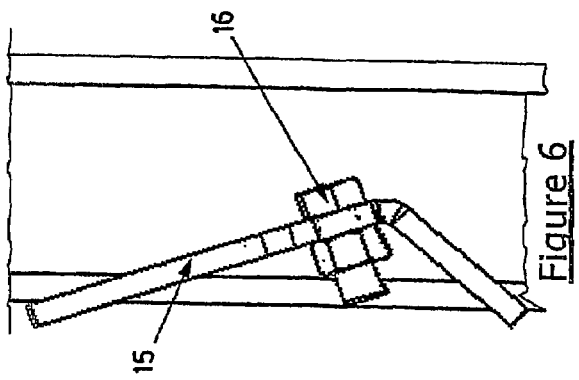
FIG. 6 is a side elevational view showing the latch catch and its adjustment means consisting of a nut mounted on a gudgeon.

As indicated previously, FIGS. 4 to 7 illustrate a preferred embodiment of the invention.

The latching assembly that is illustrated in these Figures comprises a latch catch 16 having a contact surface. This latch catch 16 is fixed to the tailgate 17 of a dump body in such a manner that its contact surface be at a given distance away from the tailgate. The latching assembly also comprises a hook 14 pivotably mounted around a first pivot fixed to the frame of the dump body. This hook 14 has a projection positioned and shaped to abut against the contact surface of the latch catch. The latching assembly further comprises an actuator 11 fixed to the frame of the dump body as well as means for transmitting movement from the actuator 11 to the hook 14.

The latching assembly according to the invention, is characterized in that the latch catch 16 comprises adjustment means for adjusting the distance between the contact surface and the tailgate 17. As illustrated, such an adjustment means may consist of a bolt mounted on a gudgeon. The latch catch can then be easily adjusted with respect to its support 15 by using a key to adjust the degree of closing of the hook and thus that of the tailgate 17 on the back of the dump body.

Preferably, the means for transmitting movement comprises a first link 12 that is connected to the actuator 11 and is pivotably mounted on a second pivot fixed on the frame of the dump body. Said means also comprises a second link 13 pivotably connected to the first link 12 and to the hook 14.

In use, the actuator 11 transmits a rotational movement to the first link 12. The first link 12 retransmits the movement of the actuator 11 to the second link 13 and to the hook 14 which is then turned between a first position in which the hook projection abuts against the contact surface of the latch catch 16, thereby preventing the tailgate 17 from opening, and a second position in which the hook projection is freed from all trajectory displacement of the latch catch 16 of the tailgate 17 thereby enabling the tailgate to open.

The actuator 11 of the latching assembly that is illustrated comprises a piston which is fixed to the post of the frame of the dump body on one side of it and is attached to a latching assembly the hook 14, to actuate at the desired pressure.

The links 12 and 13 all together form a mechanical lever that is used for opening and closing of the hook.

In closed position, the link 12 blocks the movement of the latching assembly and thus prevent it from being inadvertently opened. It also maintains the tailgate closed.

The latching assembly is thus closed by means of the latch catch 16 fixed to the support 15. As illustrated, such an adjustment means may consist of a bolt mounted on a gudgeon. This latch catch can then be easily adjusted with respect to its support 15 by using a key to adjust the degree of closing of the hook and thus that of the tailgate 17 on the back of the dump body.

The whole system made up of the actuator system 11, the links 12 and 13 and the hook 14 are advantageously fixed to a supporting structure that can be attached to a back post of the frame of the dump body. Such makes it easily removable for maintenance and repair, whenever necessary.

The invention claimed is:

1. A latching assembly for use to close a tailgate of a dump body having a frame, said latching assembly comprising:
   a latch catch having a contact surface, said latch catch being fixed to the tailgate with its contact surface extending at a given distance away from said tailgate;
   a hook pivotably mounted on a first pivot fixed to the frame of the dump body, said hook having a projection positioned and shaped to abut against the contact surface of the latch catch;
   an actuator fixed to the frame of the dump body; and
   means for transmitting movement from the actuator to the hook,
   wherein in use, said actuator transmits a rotational movement to the hook which is then turned between a first position in which the hook projection abuts against the contact surface of the latch catch, thereby preventing opening of the tailgate, and a second position wherein the hook projection is freed from any displacement trajectory from the latch catch, thereby enabling the tailgate to open, and
   wherein the latch catch comprises adjustment means for adjusting the distance between the contact surface and the tailgate.

2. The latching assembly according to claim 1, wherein said adjustment means comprises at least one nut mounted on a gudgeon.

3. The latching assembly according to claim 2, wherein the latch catch is fixed on a first support fixed to the tailgate.

4. The latching assembly according to claim 3, characterized in that the first support is devised of such a manner as to space away and raise the contact surface of the latch catch relative to an adjacent surface of the tailgate.

5. The latching assembly according to claim 4, wherein the hook, the actuator and the means for transmitting movement are fixed to a second support fixed to the frame of the dump body.

6. The latching assembly according to claim 5, wherein the second support is fixed in a detachable manner to the frame of the dump body.

7. The latching assembly according to claim 3, wherein the hook, the actuator and the means for transmitting movement are fixed to a second support fixed to the frame of the dump body.

8. The latching assembly according to claim 7, wherein the second support is fixed in a detachable manner to the frame of the dump body.

9. The latching assembly according to claim 1, wherein said means for transmitting movement comprises:
   a first link connected to the actuator, said first link being pivotably mounted on a second pivot fixed on the frame of the dump body, and
   a second link pivotably connected to the first link and to the hook.

10. The latching assembly according to claim 2, wherein said means for transmitting movement comprises:
    a first link connected to the actuator, said first link being pivotably mounted on a second pivot fixed on the frame of the dump body, and
    a second link pivotably connected to the first link and to the hook.

11. The latching assembly according to claim 3, wherein said means for transmitting movement comprises:
    a first link connected to the actuator, said first link being pivotably mounted on a second pivot fixed on the frame of the dump body, and
    a second link pivotably connected to the first link and to the hook.

12. The latching assembly according to claim 5, wherein said means for transmitting movement comprises:
    a first link connected to the actuator, said first link being pivotably mounted on a second pivot fixed on the frame of the dump body, and
    a second link pivotably connected to the first link and to the hook.

13. The latching assembly according to claim 1, wherein the actuator is pneumatic.

14. The latching assembly according to claim 2, wherein the actuator is pneumatic.

15. The latching assembly according to claim 9, wherein the actuator is pneumatic.

16. The latching assembly according to claim 11, wherein the actuator is pneumatic.

17. The latching assembly according to claim 12, wherein the actuator is pneumatic.

* * * * *